United States Patent
Rajala et al.

(10) Patent No.: US 9,503,848 B1
(45) Date of Patent: Nov. 22, 2016

(54) METHOD AND SYSTEM FOR LOCATING A WIRELESS TRACKING DEVICE ASSOCIATED WITH A NETWORK OF ALARM PANELS

(71) Applicant: Numerex Corp., Atlanta, GA (US)

(72) Inventors: Yoganand Rajala, Alpharetta, GA (US); Jeffery O. Smith, Dallas, TX (US)

(73) Assignee: Numerex Corp., Atlanta, GA (US)

( * ) Notice: Subject to any disclaimer, the term of this patent is extended or adjusted under 35 U.S.C. 154(b) by 0 days.

(21) Appl. No.: 14/789,089

(22) Filed: Jul. 1, 2015

(51) Int. Cl.
| | |
|---|---|
| H04W 24/00 | (2009.01) |
| H04W 4/02 | (2009.01) |
| H04W 4/00 | (2009.01) |
| H04W 88/06 | (2009.01) |

(52) U.S. Cl.
CPC ............... *H04W 4/02* (2013.01); *H04W 4/008* (2013.01); *H04W 88/06* (2013.01)

(58) Field of Classification Search
CPC ..... H04W 64/00; H04W 4/02; H04W 8/245; H04W 88/06; H04W 48/18
USPC ......... 455/456.1, 456.6, 418, 552.1; 370/329
See application file for complete search history.

(56) References Cited

U.S. PATENT DOCUMENTS

| | | | | |
|---|---|---|---|---|
| 2010/0046506 A1* | 2/2010 | Feldman | ................. | H04L 12/10 370/352 |
| 2010/0329181 A1* | 12/2010 | Lan | ...................... | H04W 48/18 370/328 |
| 2013/0185386 A1* | 7/2013 | Hashida | ............ | G06F 17/30241 709/217 |
| 2014/0332593 A1* | 11/2014 | Xian | .................... | G06K 7/1408 235/462.33 |
| 2015/0365789 A1* | 12/2015 | Salot | ..................... | H04W 4/02 455/456.1 |

\* cited by examiner

*Primary Examiner* — Danh Le
(74) *Attorney, Agent, or Firm* — King & Spalding LLP

(57) ABSTRACT

A wireless tracking device can operate in two or more modes in connection with determining location of the wireless tracking device. In one mode, the wireless tracking device can determine location by establishing communication with an alarm panel using a short-range transceiver. The alarm panel can have a location that is known at the alarm panel or at a remote server, for example. In another mode, the wireless tracking device can utilize a location detector, such as a GPS receiver or a short-range receiver, to determine location of the wireless tracking device.

9 Claims, 3 Drawing Sheets

METHOD AND SYSTEM FOR LOCATING A WIRELESS TRACKING DEVICE ASSOCIATED WITH A NETWORK OF ALARM PANELS

TECHNICAL FIELD

The present technology relates generally to devices for tracking locations of people and objects, and more particularly to determining location of a wireless tracking device based on short-range communication with alarm panels at certain times and, at other times, using a location detector, such as a GPS receiver or a cellular location receiver.

BACKGROUND

Wireless tracking devices can useful for tracking people, animals, and inanimate objects, for example by attaching or otherwise associating a wireless tracking device to an item being tracked. The wireless tracking device can transmit a wireless signal that conveys locational information about the wireless tracking device, and thus about the item. When a wireless tracking device is limited to utilizing a single mode of operation for location detection, the device can be subject to diminished utility when the single mode of operation performs inadequately due to excess power consumption, noise, signal loss, failure, or other factor.

Accordingly, there are needs in the art for improved location detection. For example, need exists for tracking location utilizing two or more modes of operation. A technology addressing such a need, or some related deficiency in the art, would support robust location tracking.

SUMMARY

In one aspect of the disclosure, location of a wireless tracking device can be determined using two or more modes of operation. In one mode of operation, location of the wireless tracking device can be determined via short-range communication with an alarm panel. In another mode of operation, location of the wireless tracking device can be determined using a location detector, for example a GPS receiver or a receiver that determines location using cellular signals.

The foregoing discussion of wireless tracking is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Figure 1:
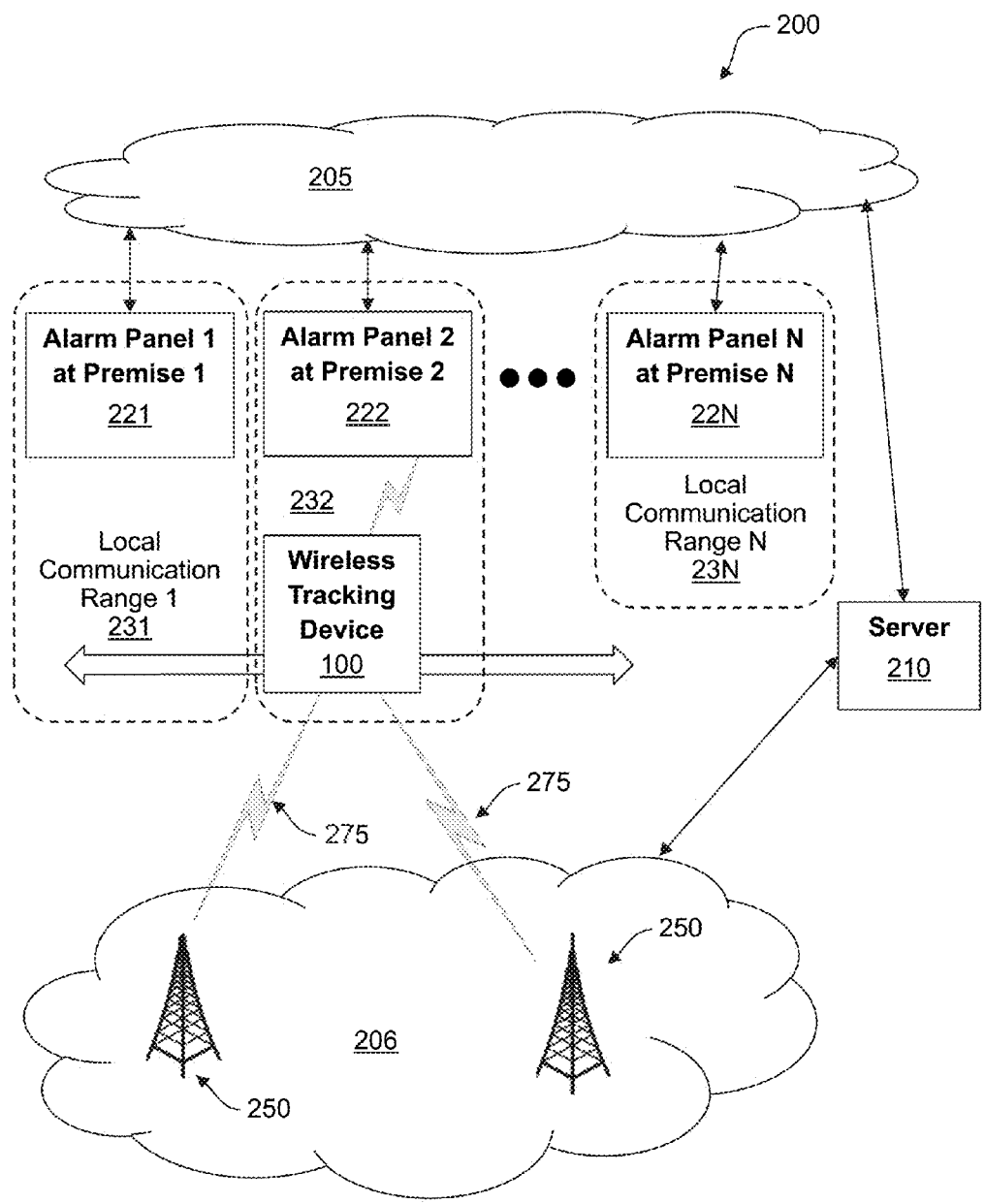
FIG. 1 is functional block diagram of a wireless tracking system in accordance with some example embodiments of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

Certain embodiments of the disclosure can improve operations of a computer-based system and process for tracking location of a device, for example by reducing energy consumption or extending battery life, by achieving more robust or accurate tracking, or by providing operational redundancy via switching tracking modes when performance of one mode diminishes or encounters an operational obstacle, for example.

Some example embodiments of the present technology will be discussed in further detail below with reference to the figures. However, the present technology can be embodied in many different forms and should not be construed as limited to the embodiments set forth herein. Rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Some of the embodiments may comprise or involve processes that will be discussed below. Certain steps in such processes may naturally need to precede others to achieve intended functionality or results. However, the technology is not limited to the order of the steps described to the extent that reordering or re-sequencing does not render the processes useless or nonsensical. Thus, it is recognized that some steps may be performed before or after other steps or in parallel with other steps without departing from the scope and spirit of this disclosure.

Turning now to FIG. 1, this figure illustrates a functional block diagram of a wireless tracking system 200 in accordance with some example embodiments of the present technology. The illustrated wireless tracking system 200 can be viewed as an example operating environment for locating a wireless tracking device 100 associated with a network of alarm panels 221, 222, . . . 22N.

In the illustrated embodiment, the wireless tracking system 200 comprises a cellular system 206. As illustrated, the wireless tracking device 100 is located within communication range of two cell towers 250 in the cellular system 206 and may communicate with either via respective communication channels 275. As the wireless tracking device 100 moves, the device 100 may communicate with different cell towers 250 (including not illustrated towers) within the cellular system 206.

The cell towers 250 can communicate with a server 210 via direct connection to the network 206. In some embodiments, the cellular system 206 communicates wirelessly with the server 210. Alternatively, communication between the cell towers 250 and the server 210 can flow through another network 205, which may comprise the Internet or a private network, for example.

In an example embodiment, the server 210 provides location services for the wireless tracking device 100 as well as for other wireless tracking devices (not illustrated) that may be attached to people, animals, or objects. In some embodiments, the server 210 can comprise a gateway or middleware server. In some embodiments, the server 210 provides a gateway for the alarm panels 221, 222, . . . 22N. In some embodiments, the sever 210 provides a gateway for the network of alarm panels 221, 222, . . . 23N and further interfaces with the wireless tracking devices 100 in connection with providing location services. In some embodiments, the server 210 may store configuration data that may be downloaded to wireless tracking devices 100 and/or to the alarm panels 221, 222, . . . 22N, such as during startup or rebooting.

In some example embodiments, the server 210 comprises a network interface, for example an Internet connection. The server 210 may further comprise memory and a processor or controller that is operably linked to the memory and to the network interface. In some example embodiments, the server 210 can comprise a group or cluster of servers acting as a single logical entity.

In some embodiments, memory of the server 210 comprises or stores a locating management engine for managing location of the wireless tracking device 100, as well as for other wireless tracking devices linked to the cellular system 206.

In an example embodiment, memory of the server 210 stores a map, a table, or database that associates alarm panel identification with geographic location of each alarm panel 221, 222, . . . 22N. For example, the alarm panel 221 may have an assigned code that the server 210 has associated with a particular street address and/or a particular set of geographic coordinates. Similarly, the alarm panel 222 may have another assigned code that the server 210 has associated with another street address and/or another set of geographic coordinates. Thus, each alarm panel 221, 222, . . . 22N can have a specific code or identification, and that code or identification can be correlated with a particular geographic location. As one alternative to the server 210 storing the alarm panel location data, each alarm panel 221, 222, . . . 22N can know and maintain a record of its own location. Alarm panel location data can also be stored in the wireless tracking device 100 or some other appropriate location.

Each alarm panel 221, 222, . . . 22N is installed at a respective premises, for example at a home or business. Each alarm panel 221, 222, . . . 22N comprises a wireless transmitter and receiver for short-range communication. Each alarm panel 221, 222, . . . 22N thus has an associated local communication range 231, 232, . . . 23N.

The alarm panels 221, 222, . . . 22N can use the short-range communication capabilities to access the network 205, for example via a wireless router. For example, the alarm panel 221 can communicate over a local wireless channel to an onsite wireless router that links to the network 205, thereby providing the alarm panel 221 with wide area connectivity via the Internet.

As discussed in further detail below, the wireless tracking device 100 can communicate with the various alarm panels 221, 222, . . . 22N as the wireless tracking device 100 moves into and out of the various associated local communication ranges 231, 232, . . . 23N.

Figure 2:
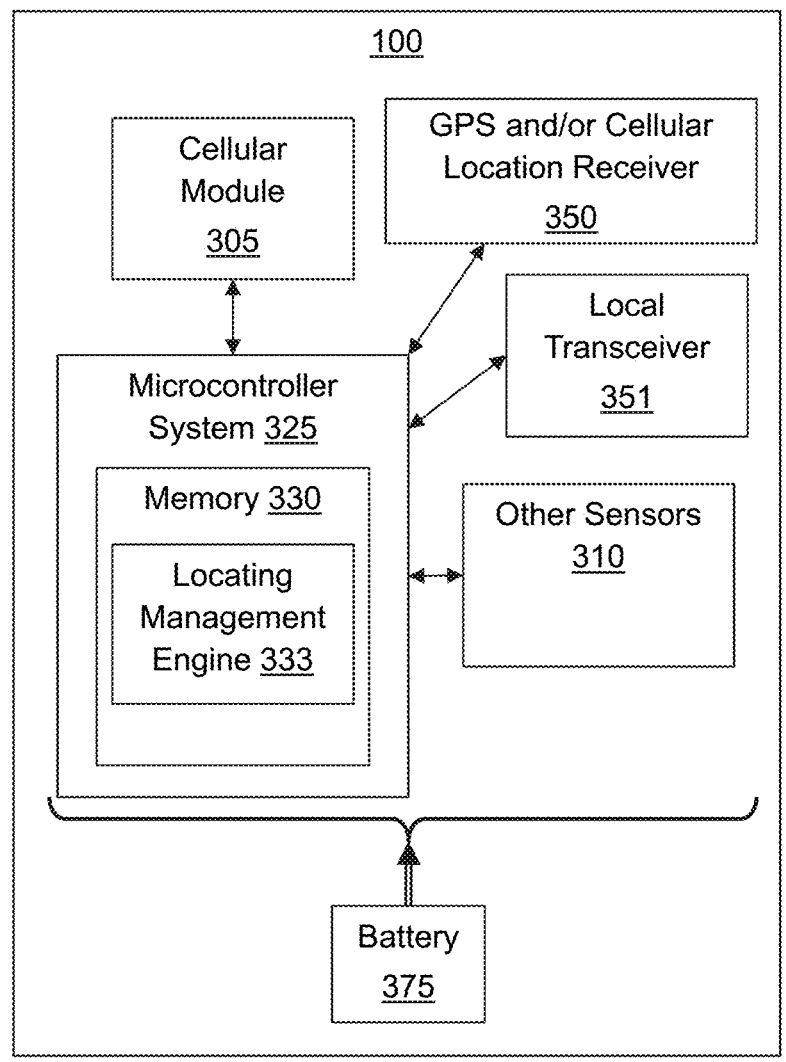
FIG. 2 is a functional block diagram of a wireless tracking device in accordance with some example embodiments of the present technology.

Turning now to FIG. 2, this figure illustrates a representative functional block diagram for the example wireless tracking device 100 according to some embodiments of the present technology.

In some example embodiments, the wireless tracking device 100 is physically attached to or otherwise associated with (and tracks) a vehicle, a package, freight, or some inanimate object. In some example embodiments, the wireless tracking device 100 tracks a person or an animal. In some example embodiments, the wireless tracking device 100 tracks one or more people in connection with monitoring their health, safety, or well being, for example patients or elderly people.

In some example embodiments, the wireless tracking device 100 comprises a device for monitoring the movement of an individual. For example, the wireless tracking device 100 can comprise an offender monitor, which may include a strap that extends around an appendage of an offender who is being monitored, such as around the offender's leg or arm. The strap can be attached to a housing that encloses electrically powered elements. The offender may be a criminal on parolee or a person who is under a government order for monitoring or a restraining order or house arrest imposed by a court or other authority, for example.

In the illustrated embodiment, the wireless tracking device 100 comprises a cellular module 305, a GPS and/or cellular location receiver 350, a local transceiver 351, a microcontroller system 325, and other sensors 310, all of which are powered by one or more on-board batteries 375. The cellular module 305 comprises an example embodiment of a radio. The GPS and/or cellular location receiver 350 comprises an example embodiment of a location detector.

The other sensors 310 may include tamper detectors, orientation sensors, switches, microphones, gyroscopes, accelerometers, temperature sensors, compasses, etc. Example tamper detectors can include switches that open or close to provide an electrical signal when a housing is opened or otherwise breached, fiber optic strands that are embedded in an offender monitor strap to break and stop transmitting an optical signal when the strap is compromised, and other appropriate tamper sensing devices.

In some example embodiments, the cellular module 305 and the GPS and/or cellular location receiver 350 are integrated into a single modem module or chip or chip set. In operation, the cellular module 305 can maintain a connection to one or more cell towers 250 over one or more wireless channels 275 through a wireless network as illustrated in FIG. 1. In an example embodiment, the cellular module 305 continuously attempts to keep a cellular connection available to the tower 250. In such an embodiment, the server 210 can control the operation of the wireless tracking device 100 by sending commands or other data to the wireless tracking device 100. In various embodiments, the cellular module 305 can comprise CDMA, GSM, UMTS, HSPA, or LTE technologies.

When triggered by the microcontroller system 325, a GPS location reading occurs on the GPS and/or cellular location receiver 350. The microcontroller system 235 can further control the cellular module 305 in connection with transmitting acquired locational information (GPS data or otherwise), notifications, alarms, and other appropriate data and with receiving commands and other data. Beyond GPS-based locating, the GPS and/or cellular location receiver 350 can obtain locational information utilizing cell-tower-based triangulation, such as advanced forward link trilateration (AFLT), or using a signal-strength-based location approach, such as received signal strength indicator (RSSI) based on tower or Wi-fi signals. The wireless tracking device 100 can utilize such technologies as embodiments of a location detector to augment or support, or as a substitution for, satellite-based location tracking. Further, GPS tracking can utilize assisted GPS (A-GPS) to improve location acquisition speed.

As illustrated, the wireless tracking device 100 comprises a local transceiver 351, which may comprise one or more Wi-fi or short-range receivers and one or more Wi-fi or short-range transmitters. The local transceiver 351 outfits the wireless tracking device 100 to communicate with each alarm panel 221, 222, . . . 22N when the wireless tracking device 100 is in the associated alarm panel local communication range 231, 231, . . . 23N.

In an example embodiment, the microcontroller system 325 comprises a low-power microcontroller and associated memory 330. The microcontroller system 325 can comprise a microprocessor or other appropriate processor, for example.

Example embodiments of the memory 330 can comprise volatile and nonvolatile memory, such as random access memory (RAM) and flash memory for example. In an example embodiment, the memory 330 can comprise firmware for executing management and control functions. For example, the memory 330 can comprise persistent memory that stores program code, including a locating management engine 333. An example embodiment of the locating management engine 333 comprises computer executable instructions for utilization of the GPS and/or cellular location receiver 350 or other location detector, or code for implementing process 500 that is illustrated in flowchart form in FIG. 3 and discussed below.

For example, the locating management engine 333 can switch between two locating modes when conditions warrant. In one mode, the locating management engine 333 can prompt the GPS and/or cellular location receiver 350 to take a location reading as discussed above. In another mode, the locating management engine 333 can prompt the local transceiver 351 to find and/or communicate with an in-range alarm panel 221, 222, . . . 22N to determine location.

In some example embodiments, location determination via GPS is the default mode of location operation for the wireless tracking device 100. In some example embodiments, location determination using the GPS and/or cellular location receiver 350 is the default mode of location operation for the wireless tracking device 100.

In some example embodiments, location determination via short-range communication with one or more alarm panels 221, 222, . . . 22N is the default mode of location operation for the wireless tracking device 100. Such an embodiment can be utilized to conserve or extend battery life as operating the local transceiver 351 may consume less energy than taking GPS-based readings, for example.

In some example embodiment, the wireless tracking device 100 switches from the default mode of location operation to the other mode of location operation when the default mode is unavailable or is subject to diminished performance. For example, the locating management engine 333 can switch away from GPS when a GPS signal is unavailable or is noisy. As another example, the locating management engine 333 can switch from location determination based on short-range alarm-panel communication to GPS-based location determination when no alarm panel 221, 222, . . . 22N is within local communication range.

Figure 3:
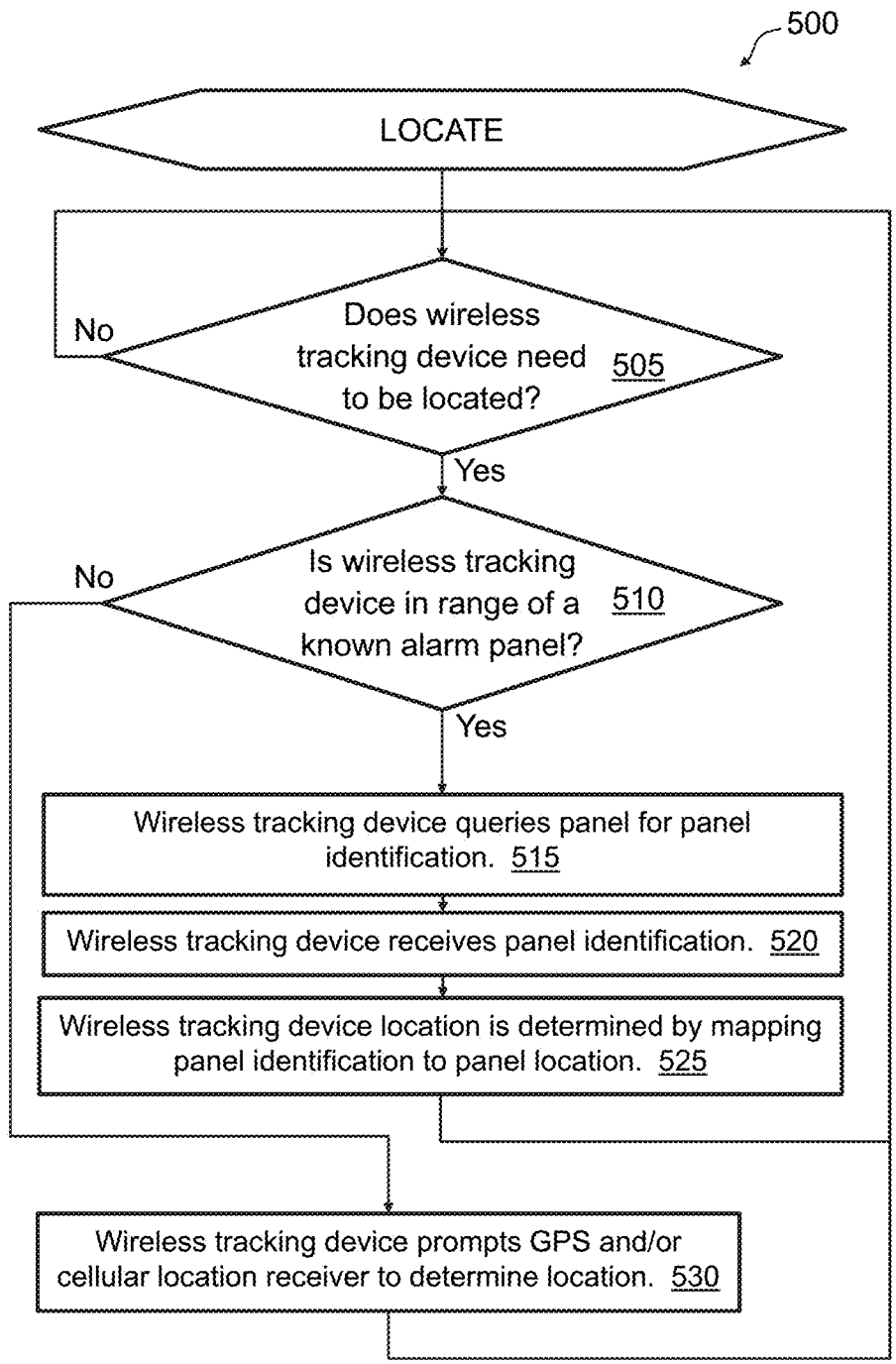
FIG. 3 is a flowchart of a process for determining location for a wireless tracking device in accordance with some example embodiments of the present technology.

An example embodiment of a process 500 for determining location of the wireless tracking device 100 will now be described in further detail with reference to the example flowchart illustrated in FIG. 3. Example reference will further be made to the preceding figures, without limitation.

In some example embodiments, instructions for execution of the relevant steps of process 500 can be stored in the memory 330 and executed by the microcontroller system 325 of the wireless tracking device 100. For example, process 500 can be practiced using instructions that are provided in the locating management engine 333 or in some other appropriate location or locations. Recognizing that the process 500 can be implemented or practiced in various places, the process 500 will be discussed below in with reference to an embodiment in which instructions are stored in the wireless tracking device 100, without limitation.

At decision block 505 of process 500, the locating management engine 333 determines whether the wireless tracking device 100 needs to be located. The decision can be based on a timer or triggered by a prompt received from the server 210 or by some other appropriate means, for example. If a location is not needed, then process 500 iterates block 505 until a determination is made that a location is needed. When the locating management engine 333 determines that a location is needed, then process 500 branches to execute decision block 510.

At decision block 510, the locating management engine 333 determines whether the wireless tracking device 100 is in local communication range 231, 232, . . . 23N of one (or more) of the alarm panels 221, 222, . . . 22N that form an alarm panel network and are linked to the server 210. Making this decision can comprise evaluating incoming signal availability and signal strength on the local transceiver 351. In an example embodiment, when proximity of an alarm panel is detected, the locating management engine 333 further determines if the detected alarm panel is within a designated alarm panel network that supports wireless tracking device location, for example a private alarm panel network.

If the locating management engine 333 makes a negative determination at decision block 510, then process 500 branches to block 530. At block 530, the locating management engine 333 prompts the GPS and/or cellular location receiver to take a location reading, as discussed above. The wireless tracking device 100 can transmit the location reading to the server 210 via the cellular network 206, for example. In the illustrated example flowchart, following execution of block 530, process 500 loops back to block 505 and iterates.

If, on the other hand, the locating management engine 333 makes a positive determination at decision block 510, then process 500 proceeds from block 510 to block 515. At block 515, the wireless tracking device 100 uses the local transceiver 351 to query the alarm panel 221, 222, . . . 22N that is in local communication range 231, 232, . . . 23N of the wireless tracking device 100. In an example embodiment, the local transceiver 351 queries that alarm panel 221, 222, . . . 22N for identification, for example a unique, panel-specific code.

At block 520, the alarm panel 221, 222, . . . 22N responds to the query and transmits the code, and the wireless tracking device 100 receives the code. Thus, the locating management engine 333 acquires the panel identification.

At block 525, the panel identification is mapped to a panel location so that the locating management engine 333 knows the location of the wireless tracking device 100. In one embodiment, the wireless tracking device 100 sends the panel identification to the server 210, and the server 210 makes the correlation utilizing a stored relational database and sends back geographic coordinates. In one embodiment, the wireless tracking device 100 sends the panel identification to the server 210, and the server 210 makes the correlation utilizing a stored relational database without sending back geographic coordinates. In such an embodiment, the wireless tracking device location can be know by the server 210 (and accessed by users having connectivity to the server 210) without the wireless tracking device 100 necessarily having location knowledge.

In one embodiment, each alarm panel 221, 222, . . . 22N maintains a location record and can report location to the wireless tracking device. In one embodiment, alarm panel locations are stored in the memory 330 of the wireless tracking device 100 so that the correlation from panel identification to panel location can be made within the wireless tracking device 100.

Once the alarm panel location is determined (and thus location of the wireless tracking device is determined) the wireless tracking device 100 can transmit the location to the server 210 using over the cellular network 206. In some embodiments, the wireless tracking device 100 transmits location to the server 210 via the network 205 using local alarm panel communication.

Following execution of block 525, execution of process 500 loops back to decision block 505 and iterates.

Technology for location determination has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. A wireless tracking device comprising:
 a transceiver configured for short-range communication with each alarm panel in a plurality of alarm panels that are geographically dispersed, that have defined locations, and that are linked to a server, wherein each alarm panel comprises a wireless transmitter and receiver for the short-range communication;
 a cellular modem configured for communication over a cellular network;
 a location detector;
 a battery that powers the transceiver, the cellular modem, and the location detector; and
 a processor that is powered by the battery and that comprises:
  a connection to the transceiver;
  a connection to the cellular modem;
  a connection to the location detector; and
  memory; and
 processor executable instructions stored in the memory to perform steps comprising:
  making a selection between a first mode and a second mode for determining location of the wireless tracking device,
  wherein the first mode comprises using the location detector to determine location, and
  wherein the second mode comprises determining location by identifying one alarm panel in the plurality of alarm panels that is in range for the short-range communication and referencing the identity of the one alarm panel to the defined location of the one alarm panel.

2. The wireless tracking device of claim 1, wherein the defined locations are stored remotely from the wireless tracking device.

3. The wireless tracking device of claim 1, wherein the defined locations are stored at the server.

4. The wireless tracking device of claim 1, wherein the defined location is stored at the alarm panel.

5. The wireless tracking device of claim 1, wherein the location detector comprises a GPS receiver.

6. The wireless tracking device of claim 1, wherein the location detector uses the cellular network to determine location.

7. The wireless tracking device of claim 1, wherein making the selection between the first mode and the second mode comprises using the first mode as a default and switching to the second mode when signal quality for the location detector drops below a threshold.

8. The wireless tracking device of claim 1, wherein making the selection between the first mode and the second mode comprises using the second mode as a default and switching to the first mode in an absence of communication with each alarm panel in the plurality of alarm panels.

9. The wireless tracking device of claim 1, wherein the steps further comprise:
 selecting between a first network and a second network to communicate locational information to a remote location,
 wherein the first network comprises the transceiver, the one alarm panel, and the server, and
 wherein the second network comprises the cellular network.

* * * * *